United States Patent [19]

Sackheim

[11] Patent Number: 5,282,357
[45] Date of Patent: Feb. 1, 1994

[54] HIGH-PERFORMANCE DUAL-MODE INTEGRAL PROPULSION SYSTEM

[75] Inventor: Robert L. Sackheim, Rancho Palos Verdes, Calif.

[73] Assignee: TRW Inc., Redondo Beach, Calif.

[21] Appl. No.: 511,153

[22] Filed: Apr. 19, 1990

[51] Int. Cl.$^5$ .............................................. F02K 9/44
[52] U.S. Cl. ......................................... 60/204; 60/257
[58] Field of Search ................. 60/218, 224, 225, 229, 60/39.094, 39.091, 257, 204; 244/169

[56] References Cited

U.S. PATENT DOCUMENTS

| | | | |
|---|---|---|---|
| 2,532,708 | 12/1950 | Goddard | 60/39.094 |
| 3,050,936 | 8/1962 | Abild et al. | 60/39.094 |
| 3,149,460 | 9/1964 | La Rocca | 60/35.6 |
| 3,170,290 | 2/1965 | Webb | 60/257 |
| 3,358,455 | 12/1967 | Hunt | 60/39.094 |
| 3,514,953 | 6/1970 | Kephart | 60/258 |
| 3,541,788 | 11/1970 | Schultz | 60/39.094 |
| 3,699,772 | 10/1972 | Elverum, Jr. | 60/39.74 A |
| 4,206,594 | 6/1980 | Elverum, Jr. | 60/258 |
| 4,305,247 | 12/1981 | Ellion et al. | 60/200 R |
| 4,322,946 | 4/1982 | Murch et al. | 60/203.1 |
| 4,787,579 | 1/1988 | Smith | 244/169 |

FOREIGN PATENT DOCUMENTS

| | | | |
|---|---|---|---|
| 2226999 | 7/1990 | United Kingdom | 244/169 |
| 877877 | 12/1987 | World Int. Prop. O. | 244/169 |

OTHER PUBLICATIONS

S. C. Knowles & S. E. Yano, "Design, Testing and Interation of a Flight-Ready Hydrazine Arcjet System," AIAA/ASME/ASEE 25th Joint Prop. Conf. Jul. 10-12, 1989, AIAA-89-2720.

C. L. Dailey & R. H. Lovberg, "Pulsed Inductive Thruster Component Technology," Final Report to Air Force Astronautics Laboratory, published Apr. 1987 by Natl. Technical Inf. Service, AFAL TR-87-012.

Dodge, Charles H. et al., "Experimental Evolution of an Earth-Storable Bimodal Rocket Engine," AIAA Paper No. 72-1128, presented at the AIAA/SAE 8th Joint Propulsion Specialist Conference, Nov. 29-Dec. 1, 1972.

Primary Examiner—Stephen G. Bentley
Attorney, Agent, or Firm—Sol L. Goldstein

[57] ABSTRACT

A propulsion system in which pure hydrazine is used as the fuel for both a bipropellant rocket engine for high-thrust performance and in multiple monopropellant thrusters for station keeping and attitude control functions. Use of a common fuel for both modes of operation significantly reduces propellant weight and inert propulsion system weight for any given mission requirements, and therefore increases the payload that can be delivered to and maintained in a desired orbit. Further, for station-keeping, the monopropellant thrusters can be augmented in performance by employing either electrothermal or additional direct chemical energy, arc jet operation, or force field acceleration, to provide increased specific impulse values up to 2,000 seconds or higher.

3 Claims, 5 Drawing Sheets

HIGH-PERFORMANCE DUAL-MODE INTEGRAL PROPULSION SYSTEM

BACKGROUND OF THE INVENTION

This invention relates generally to rocket propulsion systems and, more particularly, to rocket propulsion systems for placing and maintaining spacecraft in planetary orbits. Although the invention has broad application to unmanned spacecraft, it is particularly concerned with launching and maintaining satellites in geosynchronous orbits. Placing a geosynchronous satellite into orbit typically involves three principal mission phases. First the satellite is placed in low earth orbit not far above the earth's atmosphere, either as part of the payload of a space shuttle vehicle or on a conventional non-resusable rocket vehicle. In the second phase, the satellite orbit has its apogee or highest point raised in altitude by one or more rocket "burns" at a selected point in the orbit, until the apogee is approximately at geosynchronous altitude. Finally, the satellite is given an apogee "kick," i.e. a further rocket burn at apogee that circularizes the orbit at geosynchronous altitude.

Once in orbit, rocket engines will be called on for two further functions: station keeping and attitude control, which are sometimes referred to collectively as reaction control system (RCS) functions. Satellites are usually required to maintain a particular "station" with respect to the earth's surface. Maintaining this station requires the expenditure of energy, even though the orbit is theoretically self-sustaining and geosynchronous. Various factors, such as the non-spherical nature of the earth, the gravitational influences of the moon and sun, and so forth, require that the orbit be corrected from time to time if the required station is to be maintained. Attitude control is simply the use of multiple rocket engines on the spacecraft to maintain a particular angular attitude of the vehicle. This may be needed, for example, to point an antenna or other sensor at the earth, the sun, or a star.

Rocket engines associated with orbiting spacecraft may be called upon to perform the various functions of orbital transfer, station keeping and attitude control. Unfortunately, the performance characteristics required for these functions are not identical. A figure of merit often used in the comparison of rocket engines is the specific impulse, $I_{sp}$, which is defined as the thrust developed by the engine per unit of propellant weight flow rate. If the thrust is measured in pounds and the flow rate in pounds per second, the units for the measurement of specific impulse are seconds. The specific impulse is analogous to a miles-per-gallon figure for an automobile, since it measures how much thrust is developed for a unit fuel flow rate.

Another measure of performance is, of course, the thrust force generated by the engine. For the rapid acceleration that is required in a transition to geosynchronous orbit, particularly at the apogee "kick" phase of a mission, an engine with a relatively large thrust is required, perhaps generating up to several thousand pounds of thrust force. The specific impulse is also important, and should be in the 300-400 second range. For station keeping and attitude control, high thrust is not quite so important, since most station-keeping and attitude control maneuvers can be accomplished with low-thrust burns of the rocket engines. However, fuel economy is very important for these activities if the vehicle is to be sustained in orbit for a prolonged period.

Typically, the approaches followed to date have involved using multiple fuels and engine systems for the two tasks. For example, a solid rocket is used for the apogee kick engine and hydrazine catalytic engines for the station keeping and attitude control system thrusters. There is nothing inherently wrong with this traditional approach, except that the use of two separate propulsion systems severely limits the size of the useful payload that can be placed and maintained in orbit.

Some improvement can be obtained using an integrated bipropellant system, in which both the apogee kick engine and the RCS thrusters use a bipropellant fuel system, such as monomethyl hydrazine (MMH), as the fuel and nitrogen tetroxide ($N_2O_4$) as the oxidizer. However, there is still room for further improvement in the payload that can be placed in orbit for a given mission. Another way to look at the problem is that there is room for improvement in the lifetime that a given spacecraft payload may be maintained in orbit. With a more efficient propulsion system, a greater payload may be maintained in orbit for a given time, or the same payload may be maintained in orbit for a longer time.

The present invention provides a more efficient propulsion system suitable for geosynchronous and other high-energy mission spacecraft programs.

SUMMARY OF THE INVENTION

The present invention resides in a propulsion system employing the same fuel in both a bipropellant mode for high-thrust orbital transitions, and a monopropellant mode for station keeping and attitude control, to reduce propellant weight requirements and increase the payload that can be delivered to and maintained in a desired orbit. Briefly, and in general terms, the propulsion system of the invention comprises a liquid fuel bipropellant high-thrust engine, a liquid fuel tank and an oxidizer tank connected to the high-thrust engine, and a plurality of monopropellant reaction control thrusters for station keeping and attitude control. The monopropellant thrusters are connected to the same liquid fuel tank and use the same fuel as the high-thrust engine, to provide a substantial saving in propellant weight and propulsion system inert weight for given mission requirements. Therefore, a higher effective payload may be placed and maintained in a desired orbit than if other more conventional propulsion systems are used.

More specifically, the liquid fuel used in the propulsion system of the invention is pure hydrazine. The oxidizer may be nitrogen tetroxide ($N_2O_4$), liquid oxygen, nitrogen trifluoride ($NF_3$), nitrogen tetrafluoride ($N_2F_4$), or combinations of these substances.

Optionally, the monopropellant motors may include at least one electrothermally augmented thruster, or at least one arc jet thruster, or a chemical augmenter that injects an oxidizer downstream of the catalyst bed, thereby adding chemical energy in an after-burner mode, or at least one force field acceleration motor, all of which provide increased specific impulse performance.

The high-thrust engine preferably includes means for reducing unwanted combustion of fuel after shutdown, in the fuel line upstream of the combustion chamber. One option is to purge the fuel line with an inert gas. Another is to delay closure of the fuel valve to ensure that all oxidant has been reacted.

It will be appreciated from the foregoing that the present invention represents a significant advance in the field of rocket propulsion systems. In particular, because the system of the invention uses the same liquid fuel, hydrazine, for both bipropellant and monopropellant propulsion modes, there is a resultant saving in propellant weight and inert propulsion system weight for any given mission, and more payload can be placed and maintained in a desired orbit. Other aspects and advantages of the invention will become apparent from the following more detailed description, taken in conjunction with the accompanying drawings.

DESCRIPTION OF THE PREFERRED EMBODIMENT

Figure 1B:
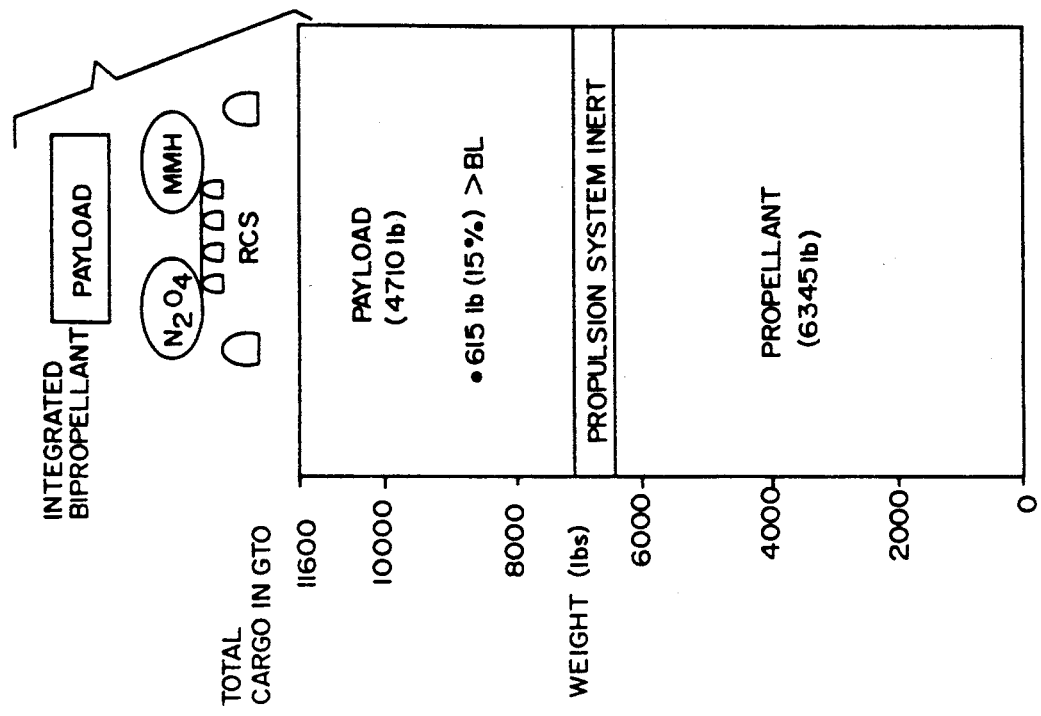
FIGS. 1a, 1b and 1c are a diagrammatic comparison of three propulsion systems, including FIG. 1a a solid propellant high-thrust motor and hydrazine catalytic thruster, FIG. 1b an integrated bipropellant system using monomethyl hydrazine fuel for both a high-thrust engine and reactive control system thrusters, and FIG. 1c the dual mode propulsion system of the invention.

As shown in the drawings for purposes of illustration, the present invention is concerned with a novel propulsion system that is particularly well suited for geosynchronous spacecraft missions. In the past, multiple propulsion systems or integrated bipropellant systems have been used to transfer a spacecraft to geosynchronous orbit and to maintain it in orbit.

Figure 1A:
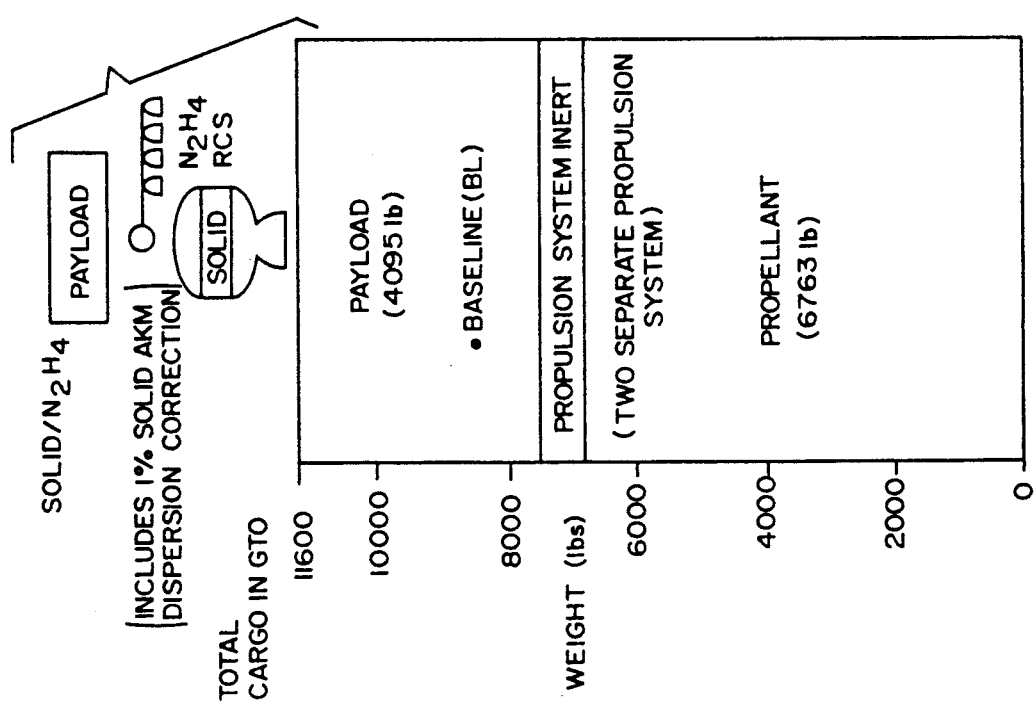
Figure 1C:
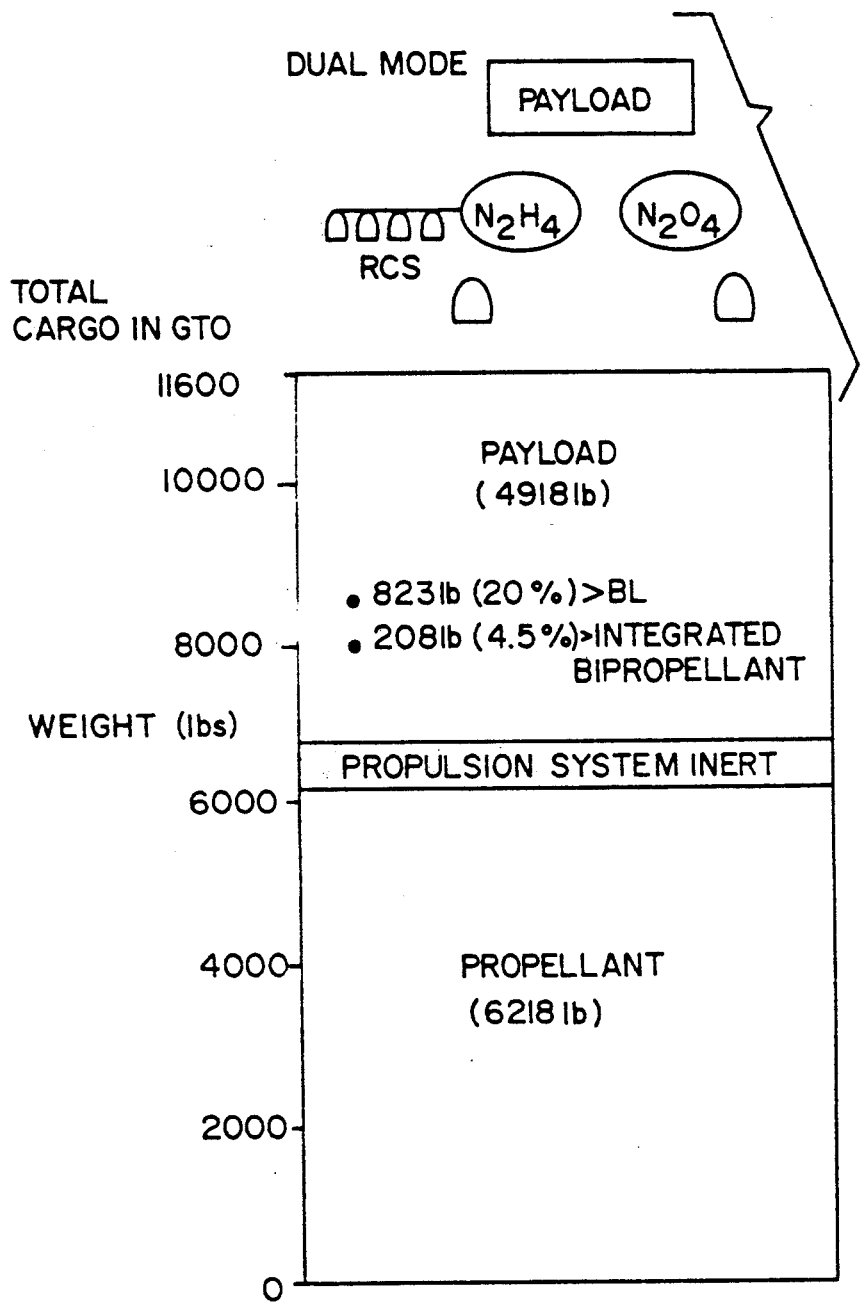

In accordance with the present invention, a dual-mode propulsion system employs the same fuel, pure hydrazine, in a bipropellant mode for injection into the geosynchronous orbit, and in a monopropellant mode for station keeping and attitude control. FIG. 1 compares three types of propulsion systems, including that of the present invention, for a typical mission. The total cargo weight placed into a transfer orbit between a low earth orbit and a geosynchronous orbit, assumed to be the same for all three cases, namely 11,600 pounds. The mission includes the use of an apogee kick engine to effect a transfer to geosynchronous orbit, and an assumed life of ten years of station keeping and attitude control activities.

In a conventional approach, shown on the left of the figure and indicated at (a), a solid-fuel rocket is used for the transfer to geosynchronous orbit, and multiple hydrazine catalytic thrusters are used for station keeping and attitude control duties. The total propellant load is calculated at 6,763 pounds. The remaining component of the total weight of the vehicle is the inert propulsion system weight, calculated at 742 pounds. The payload delivered to the orbit, exclusive of remaining fuel and inert propulsion component, is 4,095 pounds.

In an integrated bipropellant propulsion system, illustrated in the center of the figure and indicated at (b), the same fuel is used in all phases of the mission, namely monomethyl hydrazine (MMH) with nitrogen tetroxide ($N_2O_4$) as the oxidizer. The propellant requirements are reduced to 6,345 pounds and the inert propulsion system component is reduced to 545 pounds. Therefore, the payload is increased by about 15%, to 4,710 pounds.

In the propulsion system of the invention, illustrated on the right of the figure and indicated at (c), pure hydrazine ($N_2H_4$) is used as the fuel for both phases of the mission, but is used in a bipropellant mode for the apogee kick phase, and in a monopropellant mode with electrical or chemical augmentation in the station keeping and attitude control phase. The total propellant weight is reduced to 6,218 pounds, and the inert component weight to 464 pounds. The payload is increased to 4,918 pounds, an increase of about 20% over the conventional propulsion system on the left of the figure.

Figure 2:
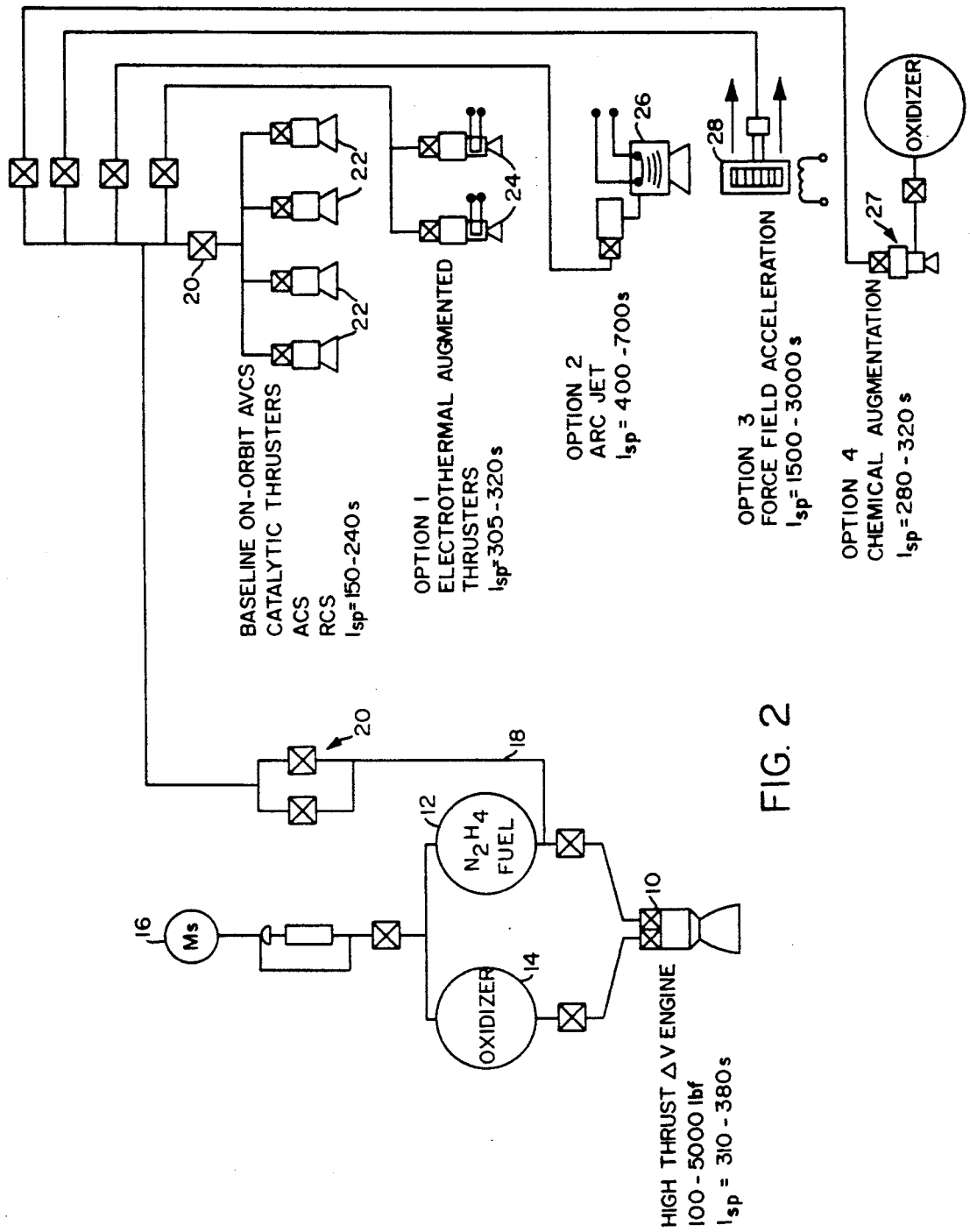
FIG. 2 is a schematic diagram of the dual mode propulsion system of the invention, including its various options.

FIG. 2 shows diagrammatically a typical propulsion system configuration in accordance with the present invention. The configuration includes a liquid apogee engine, indicated by reference numeral 10, used for the apogee kick phase of a mission. It will be understood that there may be multiple apogee engines instead of the one shown. The apogee engine 10 is supplied with fuel from a hydrazine fuel tank 12 and with oxidizer from an oxidizer tank 14. These tanks 12, 14 are pressurized conventionally using a pressurant supply tank 16, containing a pressurized inert gas, such as helium.

The hydrazine fuel tank 12 is also connected, by line 18 and appropriate valves 20, to multiple thrusters 22, four of which are shown. These are conventional hydrazine catalytic thrusters. A catalyst within each thruster reacts with the hydrazine fuel and produces various gaseous products that are ejected as the fuel is consumed. These thrusters may be used for attitude control only, or for attitude control and station keeping functions. They typically have a specific impulse of about 150-240 seconds, depending upon the mode of operation.

The oxidizer used may be nitrogen tetroxide ($N_2O_4$) or other higher energy oxidizers, such as liquid oxygen, nitrogen trifluoride ($NF_3$), nitrogen tetrafluoride ($N_2F_4$), or combinations of these.

In accordance with an important aspect of the invention, additional propulsion options may employed with the hydrazine fuel to produce thrust even more efficiently for station keeping. The first of these options is to use electrothermal augmented thrusters, as indicated at 24, developing a specific impulse in the range of approximately 305-320 seconds. Electrothermal augmented thrusters may, for example, be of the type described in U.S. Pat. No. 4,322,946 issued to Murch et al. and assigned to the same assignee as the present invention. The increase in specific impulse provided by these thrusters is obtained at the expense of very little increase in thruster weight, but the propellant weight requirement is further reduced for a given mission, as a result of the increased specific impulse performance.

Another option for the station keeping function is to use the same hydrazine fuel in an arc jet engine, indicated diagrammatically at 26. As in the conventional and the electrothermally augmented thrusters, gas is still produced by the catalytic process, but in this case the gas is passed through an arc jet. Again, the increase in specific impulse is obtained at very little weight expense, and the propellant weight requirement is drastically reduced. The specific impulse obtained in the arc jet engine is approximately 400-700 seconds. Arc jet technology has been developed by others. For example, see "Design, Testing and Integration of a Flight-Ready Hydrazine Arcjet System," by S.C. Knowles and S.E. Yano, presented at the 25th Joint Propulsion Conf. AIEE/ADME/SAE/ASEE, Monterey, Calif., Jul. 10-12, 1989, published by the American Institute of Aeronautics and Astronautics, (AIAA-89-2720).

Still another option to improve the performance of the hydrazine fuel for station keeping is to use thermochemical augmentation by adding an oxidizer downstream of the catalyst bed in an after-burning section, as indicated diagrammatically at 27. This oxidizer may be $N_2O_4$ or even a higher energy reactant such as gaseous oxygen ($GO_2$). This addition of chemical energy in an after-burner section will raise the specific impulse for station keeping into the 280 to 320 second range. This increase in performance will be achieved without requiring any more power than is used for a conventional catalytic hydrazine thruster. This can be a major advantage in saving propellant weight for station keeping or other maneuvers for power-limited spacecraft.

A final option in utilizing the hydrazine fuel more efficiently is a force field acceleration motor 28 to provide even greater improvement in the specific impulse performance, up to 1,500-3,000 seconds. The conventional catalytic thrusters can be usefully employed in today's vehicles having power needs in 2-kilowatt range. For vehicles with power needs up to approximately 5 kilowatts, the electrothermally augmented thrusters and arc jets may be required. The remaining option, using force field acceleration, provide for vehicle power needs well in excess of 5 kilowatts, and perhaps as high as 100 kilowatts. Force field acceleration technology, otherwise known as pulsed inductive thruster technology, has become quite well defined in recent years. A basic description of this technology may be found in a publicly released Final Report for the Air Force Astronautics Laboratory, Edwards Air Force Base, California 93523-5000, prepared by C.L. Dailey and R.H. Lovberg, and entitled "Pulsed Inductive Thruster Component Technology," Final Report for the period Oct. 1, 1982 to Oct. 31, 1986, published April 1987, AFAL TR-87 012.

Figure 3:
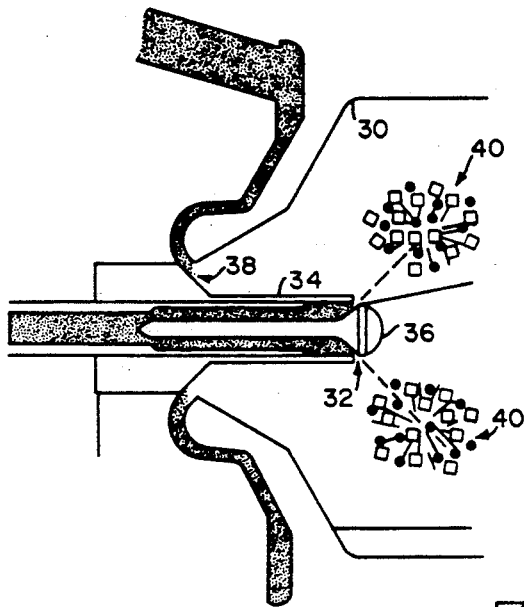
FIG. 3 is a diagrammatic cross-sectional view illustrating operation of a coaxial injector for use in the high-thrust engine that is part of the invention.

Efficient operation of the engine 10 with pure hydrazine as the fuel depends very much on obtaining combustion stability in the engine. In the preferred embodiment of the invention, combustion stability is obtained primarily with the use of a coaxial fuel injector of the same general type disclosed in U.S. Pat. Nos. 3,699,772 and 4,206,594, issued in the name of Elverum, Jr. FIG. 3 shows in diagrammatic form how the coaxial injector achieves smooth and continuous mixing of the fuel and oxidizer. Fuel is injected into a combustion chamber 30 through an annular orifice 32 between a sleeve 34 and a coaxial pintle 36 installed in the sleeve. Oxidizer is also injected through an annular orifice 38, between an outer portion of the sleeve 34 and a surrounding portion of the wall of the combustion chamber 30. The injected fuel and oxidizer diverge from their respective orifices in streams that intersect and mix together in a generally annular combustion region, indicated at 40. The resulting combustion process is relatively smooth and stable, in spite of the use of the extremely reactive pure hydrazine as the fuel.

Figure 4:
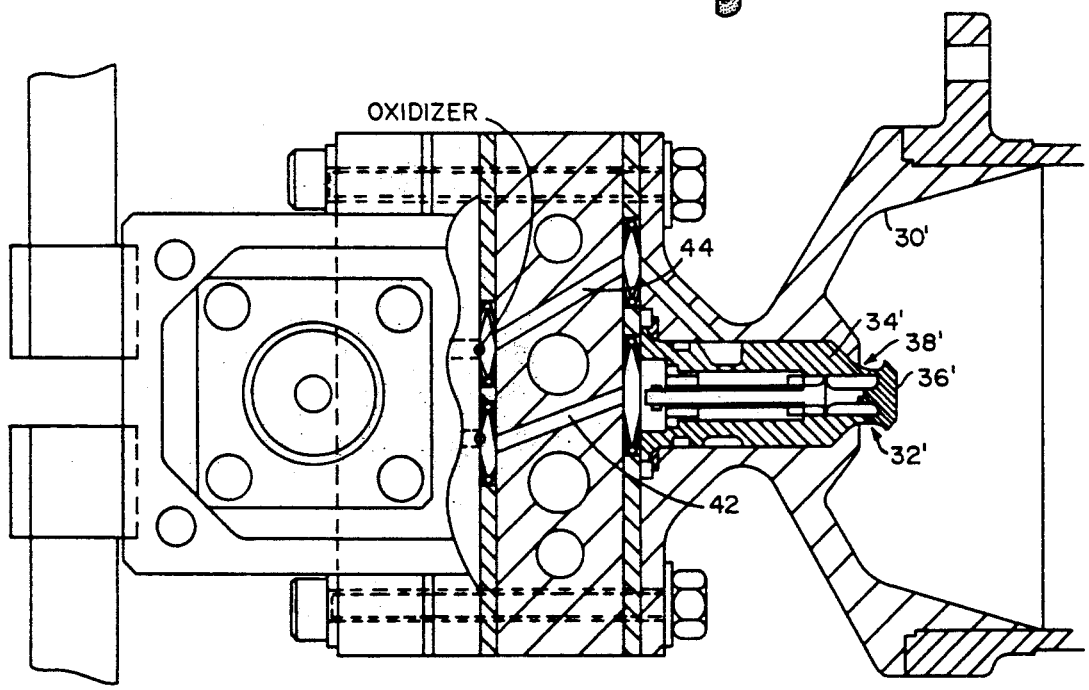
FIG. 4 is a fragmentary cross-sectional view of the coaxial injector used in the high-thrust engine that is part of the invention.

FIG. 4 is a more detailed cross-sectional view of the coaxial injector assembly of the engine 10, showing a portion of the combustion chamber 30', a pintle 36', and a pintle sleeve 34'. Fuel enters the assembly through a fuel passage 42 and is injected through an annular orifice 32'. Oxidizer enters through an oxidizer passage 44 and is injected through an annular orifice 38'.

Depending on details of the engine design, a significant difficulty may be encountered in shutdown of the high-thrust engine 10 operating on pure hydrazine fuel. Because the oxidizer, such as nitrogen tetroxide, has a higher vapor pressure than the hydrazine fuel, the oxidizer has a tendency to back up into the fuel line, where it mixes with residual hydrazine and causes a violent overpressure on shutdown. The overpressure, which can be of almost explosive force, tends to deform the pintle 32 with respect to the surrounding sleeve 34. Carefully designed geometric relationships defining the fuel and oxidizer flow passages may be distorted as a result. One solution to this problem is simply to strengthen the components mechanically. This may be sufficient in some cases, especially where only one or two shutdowns are contemplated during the course of a single mission. However, for missions calling for a larger number of engine shutdowns another solution is needed.

Figure 5:
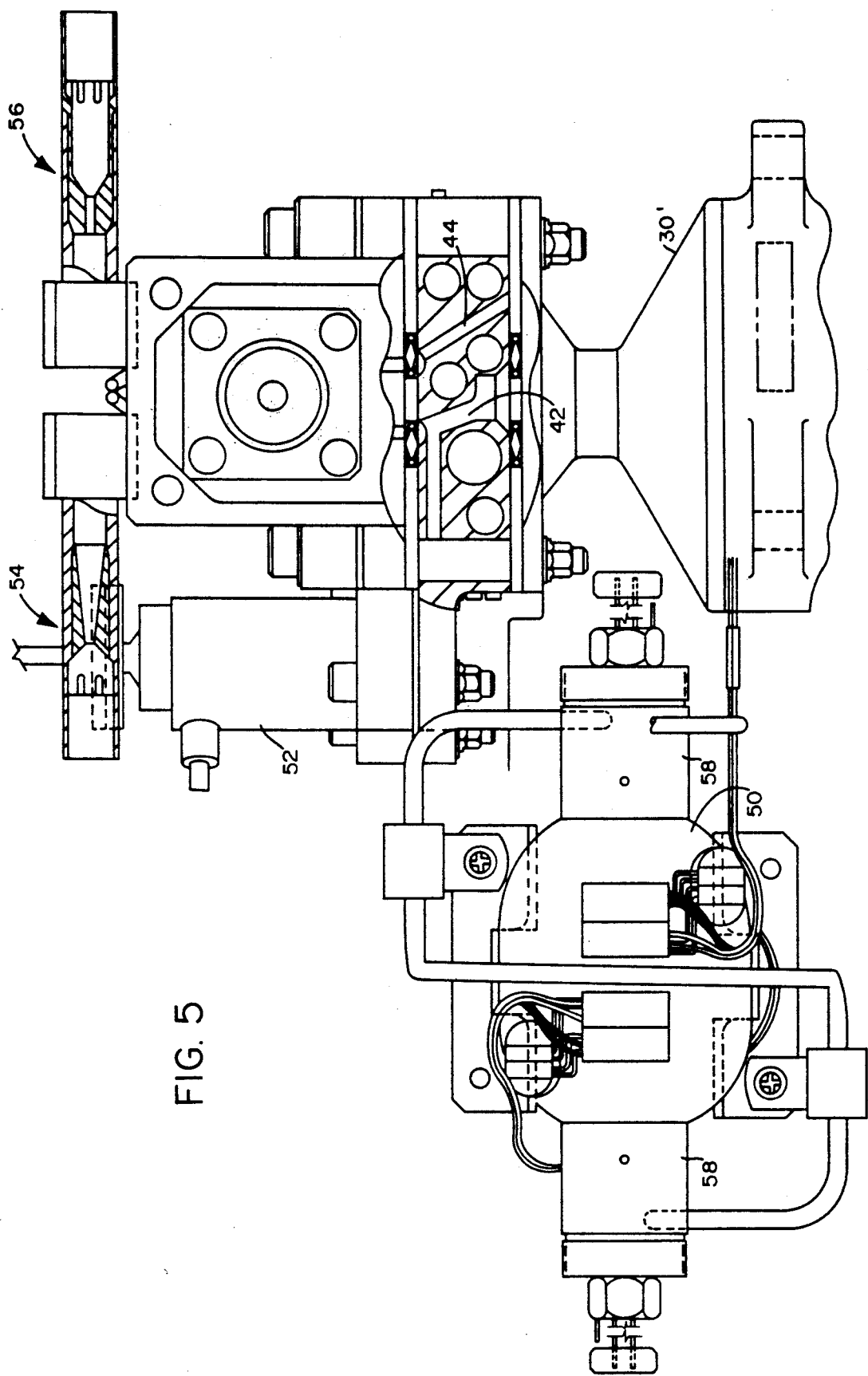
FIG. 5 is a view similar to FIG. 4, but showing in addition an inert nitrogen tank and purge control valve for purging the fuel line on shutdown.

In the presently preferred embodiment of the invention, fuel remaining in the fuel line downstream of the fuel shutoff valve is automatically purged into the combustion chamber 30' by an inert gas. More specifically, as shown in FIG. 5, the engine further includes an inert gas storage tank 50 and a purge control valve 52 to which the inert gas is connected. When the engine is shut down, by closing off the flow of fuel and oxidizer at valves 54 and 56, respectively, the purge control valve 52 is momentarily opened, and an inert gas, such as nitrogen, purges the liquid hydrazine from the fuel line downstream of the fuel valve 54, flushing it into the combustion chamber 30' and thereby preventing unwanted combustion in the fuel line and potential damage to the pintle 36'. For safety, the inert gas tank 50 is sealed during vehicle launch by two pyrovalves 58, which are later opened to allow the gas to flow as far as the purge control valve 52. The closed valves 58 prevent any unwanted interruption or contamination of fuel flow during the critical launch phase of the engine.

An alternative approach, without using inert gas to purge the fuel supply line, is to delay closing of the fuel valve 54 for a preselected time after closing of the oxidizer valve 56. In essence, the fuel purges itself from the line, until all of the oxidizer entering the combustion chamber has been reacted with fuel. The specific time delay needed is best established experimentally with a specific engine design, but is typically less than one second.

It will be appreciated from the foregoing that the present invention represents a significant advance in the field of spacecraft propulsion systems. In particular, the invention provides a dual mode propulsion system that uses an identical fuel in two phases of a mission, as the fuel of a bipropellant engine for apogee kick or other high-energy phases of a mission, and as a monopropellant for station keeping and attitude control phases of the mission. In addition, the specific can be enhanced by various options, including electrothermal augmentation, arc jet operation, and force field acceleration. Another advantage of the invention is that the high-thrust engine operates on pure hydrazine as a fuel, without significant problems at shutdown. This is in part due to the use of an inert gas to purge the fuel line upon shutdown, or the alternative use of a delay in shutting off the fuel, to ensure that all of the oxidizer has been reacted in the combustion chamber. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A high-performance liquid fuel bipropellant high-thrust rocket engine, comprising:
    a fuel supply including a supply tank, fuel line and fuel supply valve;
    an oxidant supply including a supply tank, oxidant line and oxidant supply valve;
    a combustion chamber having an inlet for the fuel and oxidant connected to the fuel and oxidant lines; and
    means for minimizing unwanted combustions after shutdown of the engine by delaying closure of the fuel supply valve until after closure of the oxidant supply valve, to ensure that combustion is completed in the combustion chamber.

2. A method of operating a high-performance liquid-fuel bipropellant high-thrust rocket engine, the method comprising the steps of:
    operating the engine with fuel and oxidizer supply valves open to supply fuel and oxidizer to a combustion chamber;
    shutting down the engine by closing the fuel and oxidizer supply valves to terminate flow of the fuel and oxidizer to the engine combustion chamber; and
    controlling the engine during shutdown to minimize combustion of fuel in a region downstream of the fuel supply valve and upstream of the combustion chamber by delaying closure of the fuel supply valve until after closure of the oxidizer supply valve, thereby ensuring that all remaining quantities of the oxidizer have been reacted with fuel in the combustion chamber and not in the region where combustion may otherwise take place.

3. A dual-mode rocket propulsion system, comprising:
    a high-performance liquid-fuel bipropellant high-thrust engine having a combustion chamber;
    a liquid fuel tank connected to the combustion chamber of the high-thrust engine through a fuel supply valve and a fuel supply line;
    an oxidizer tank connected to the combustion chamber of the high-thrust engine through an oxidizer supply valve and an oxidizer supply line;
    a plurality of monopropellant reaction control motors for station keeping and attitude control connected to the liquid fuel tank and employing the same fuel as the high-thrust engine, thus saving substantial propellant weight and propulsion system inert weight for given mission requirements to provide a high effective payload; and
    means for minimizing unwanted combustions after shutdown of the engine by delaying closure of the fuel supply valve until after closure of the oxidant supply valve, to ensure that combustion is completed in the combustion chamber.

* * * * *